United States Patent
Parsons et al.

(10) Patent No.: US 9,805,458 B2
(45) Date of Patent: Oct. 31, 2017

(54) METHOD AND SYSTEM FOR DETECTING DEFECTIVE PIXELS AND SCREEN IMPERFECTIONS OF A MOBILE DEVICE

(71) Applicant: Communications Test Design, Inc., West Chester, PA (US)

(72) Inventors: Gerald J. Parsons, Chester Springs, PA (US); Michael P. Parsons, West Chester, PA (US); Leo D. Parsons, Chester Springs, PA (US); Nidhin Davis, Avondale, PA (US); Andrew Sieben, Wilmington, DE (US); Sean Parsons, West Chester, PA (US); Mohammad R. Paknejad, Glenmoore, PA (US); Marc Aurel Kamsu Tennou, West Chester, PA (US); John J. McGrath, Kennet Square, PA (US)

(73) Assignee: Communications Test Design, Inc., West Chester, PA (US)

(*) Notice: Subject to any disclaimer, the term of this patent is extended or adjusted under 35 U.S.C. 154(b) by 0 days.

(21) Appl. No.: 15/409,079

(22) Filed: Jan. 18, 2017

(65) Prior Publication Data
US 2017/0278232 A1 Sep. 28, 2017

Related U.S. Application Data

(60) Provisional application No. 62/312,282, filed on Mar. 23, 2016.

(51) Int. Cl.
*G06K 9/00* (2006.01)
*G06T 7/00* (2017.01)
*G06K 9/46* (2006.01)

(52) U.S. Cl.
CPC .......... *G06T 7/0004* (2013.01); *G06K 9/4642* (2013.01); *G06T 2207/10024* (2013.01); *G06T 2207/20021* (2013.01); *G06T 2207/30121* (2013.01)

(58) Field of Classification Search
None
See application file for complete search history.

(56) References Cited

U.S. PATENT DOCUMENTS

| | | | | |
|---|---|---|---|---|
| 7,664,317 | B1* | 2/2010 | Sowerby | G06T 7/0002 382/162 |
| 2005/0232476 | A1* | 10/2005 | Hayakawa | G09G 3/006 382/141 |
| 2008/0239112 | A1* | 10/2008 | Naito | H04N 5/23241 348/246 |
| 2012/0133804 | A1* | 5/2012 | Kim | H04N 5/3675 348/246 |
| 2014/0376800 | A1* | 12/2014 | Cooper | G01N 21/8851 382/141 |
| 2015/0138060 | A1* | 5/2015 | Takayanagi | G01J 1/4204 345/102 |
| 2016/0227209 | A1* | 8/2016 | Kunkel | H04N 17/004 |

* cited by examiner

*Primary Examiner* — Sean Conner
(74) *Attorney, Agent, or Firm* — Barley Snyder

(57) ABSTRACT

A method for detecting defective pixels and screen imperfections is provided and include the steps of: positioning a mobile device having a display screen in a testing chamber, capturing an image of the display screen using a camera directed to a the display screen, and performing a perform a pixel detection analysis of the image.

7 Claims, 14 Drawing Sheets

| 125, 125, 200 (A11) | 150, 175, 175 (A12) | 175, 150, 175 (A13) |
| 250, 250, 200 (A21) | 150, 200, 200 (A22) | 50, 50, 150 (A23) |
| 100, 150, 150 (A31) | 150, 200, 200 (A32) | 150, 150, 125 (A33) |

FIG. 19

| 25, 75, 0 (B11) | 0, 25, 25 (B12) | 25, 50, 25 (B13) |
| 100, 50, 0 (B21) | 150, 200, 200 (B22) | 100, 150, 50 (B23) |
| 50, 50, 50 (B31) | 0, 0, 0 (B32) | 0, 50, 75 (B33) |

FIG. 20

METHOD AND SYSTEM FOR DETECTING DEFECTIVE PIXELS AND SCREEN IMPERFECTIONS OF A MOBILE DEVICE

FIELD OF THE INVENTION

The invention relates to a method and system for detecting a defective pixel and, more particularly, to a method and system for detecting defective pixels and screen imperfections of a mobile device.

BACKGROUND

Defective pixels are pixels on a liquid crystal display (LCD) that are not performing as expected. Defective pixels in LCDs generally fail to reproduce light levels correctly. There are several variations of defective pixels in LCD's, including dark dot defects, bright dot defects, partial sub-pixel defects, tape automated bonding (TAB) faults, and stuck sub-pixels.

In LCD manufacturing, it is common for a display to be manufactured that has a number of sub-pixel defects, wherein each pixel is composed of three primary-colored sub-pixels (i.e. RGB or CMYK color models). The number of faulty pixels tolerated, before a display is rejected, is dependent on the class that the manufacturer has given the display (although officially described by the ISO 13406-2 standard, not all manufacturers interpret this standard the same way, or follow it at all). Some manufacturers have a zero-tolerance policy with regard to LCD displays, rejecting all units found to have any number of (sub-)pixel defects. Displays meeting this standard are deemed Class I. Other manufacturers reject displays according to the number of total defects, the number of defects in a given group (e.g., 1 dead pixel or 3 stuck sub-pixels in a 5×5 pixel area), or other criteria.

Furthermore, many mobiles devices have touchscreens that are vulnerable to imperfections, including scratches. While touchscreens have become harder, mobile devices still are susceptible to imperfection from even harder materials.

Generally, mobile devices, including tablets and phones, use LCD displays and touchscreens to cover the LCD displays. With the increasing usage of computer network services all over the world, these mobile devices are in great demand. As a result, the cost of used mobile devices has increased. However, as with any used devices, the used mobile device needs to be tested to determine operability, especially with respect to the working displays and imperfections. There is a need to efficiently and effectively detect defective pixels and screen imperfections of new and used mobile devices.

SUMMARY

A method for detecting defective pixels and screen imperfections is provided and include the steps of: positioning a mobile device having a display screen in a testing chamber, capturing an image of the display screen using a camera directed to a the display screen, and performing a perform a pixel detection analysis of the image.

BRIEF DESCRIPTION OF THE DRAWINGS

The invention will now be described by way of example with reference to the accompanying Figures of which:

FIG. 19 is a graphical representation showing actual RGB values compared to a center questionable pixel in an exemplary embodiment of the invention;

FIG. 20 is a graphical representation showing a difference of RGB values compared to the center questionable pixel in the exemplary embodiment of the invention;

DETAILED DESCRIPTION OF THE EMBODIMENT(S)

Now with reference to the drawings, a method and system for detecting defective pixels and screen imperfections according to the invention will be described.

Figure 1:
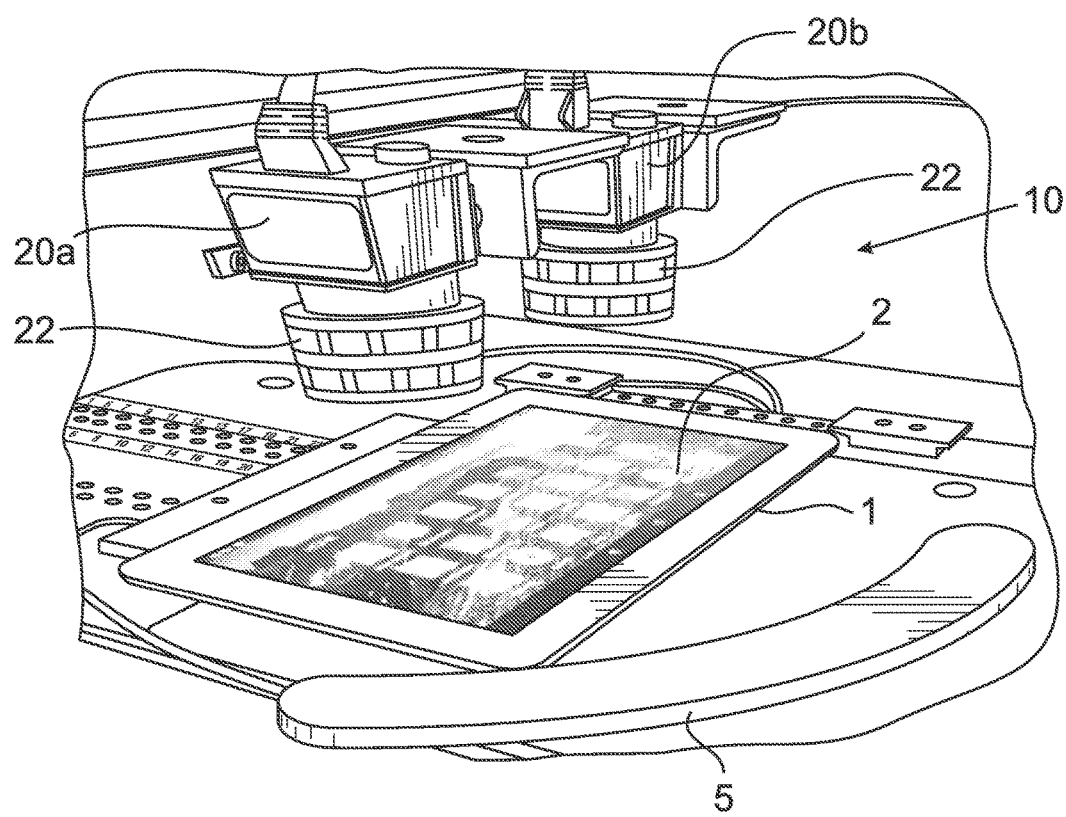
FIG. 1 is a pictorial representation of a mobile device positioned in a testing chamber having one or more testing camera used for a method and system for detecting defective pixels and screen imperfections according to the invention.

First with reference to FIG. 1, the invention generally relates to a method and system for detecting defective pixels and screen imperfections of a mobile device 1. Structurally, the mobile device 1 includes a display 2 that is positioned in a testing chamber 10 having one or more testing cameras 20. For instance, in an exemplary embodiment to be described, the mobile device 1 is a 7" tablet with a resolution of 1024×600. In an exemplary embodiment, a pair of cameras 20a, 20b (i.e. Basler HD—5 MP) are mounted inside the testing chamber 10.

The mobile device 1 is loaded with a defective pixel mobile application to analyze the pixels and the display 2. The defective pixel mobile application can be loaded through known cables, connectors and communications protocols. The defective pixel mobile application includes an algorithm that uses high quality images taken by one or more testing cameras 20 to identify defective pixels. It is important that each of the pixels of the mobile device 1 needs to be clearly visible for analysis and the changes in the pixel RGB values need to be clearly identified. In particular, in the exemplary embodiment, the defective pixel mobile application sets the whole display 2 black with a backlight turned ON to a maximum setting. The black display and backlight set to ON combine to illuminate the defective pixel as a white pixel, making any defective pixel readily identifiable in contrast to the surrounding black pixels. The defective pixel mobile application, in an exemplary embodiment, is a custom Android application, but may be an application that functions on other mobile device operating systems known to those with ordinary skill in the art.

The mobile device 1 is manually positioned on a retention device 5 with the display 2 facing upward and way from the retention device 5. The retention device 5 is then positioned in the testing chamber 10, for instance, using a sliding shelf. The testing chamber 10 is then closed and sealed from exterior light. The pair of cameras 20a, 20b are positioned facing the display 2 from a top of the testing chamber 10, as shown in FIG. 1.

In an exemplary embodiment of the invention, the method and system for detecting defective pixels and screen imperfections of a mobile device 1 uses a two camera system for large screens, such as tablet screens, so that the pixels of the mobile device 1 are clearly visible for analysis. However, for mobile devices having smaller screens, such as mobile phones, the method and system for detecting defective pixels and screen imperfections of a mobile device 1 may use a one camera system.

As shown in the two camera system, the method and system can detect changes in the pixel RGB values. The first testing camera 20a is positioned to capture and image of a top portion of the display 2, while the second camera 20b is positioned to capture an image of a bottom portion of the display 2. The first testing camera 20a is positioned side by side with the second camera 20b. The use of a two camera system makes defective pixels clearly visible when captured images are analyzed using the system and method described below.

An exemplary embodiment of the camera arrangement in the testing chamber is clearly shown in FIG. 1 below. Images captured by both the first testing camera 20a and the second testing camera 20b are performed in a dark environment to avoid external light reflections, which could cause false defects when using the method and system for detecting defective pixels and screen imperfections according to the invention.

Figure 2:
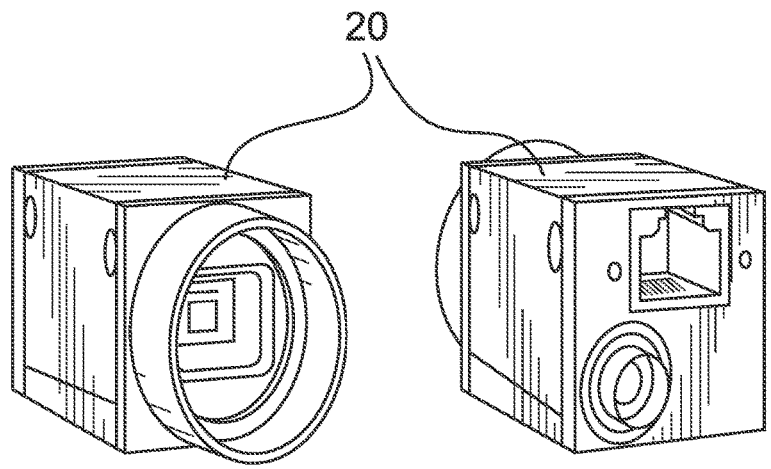
FIG. 2 is pictorial representation of a testing camera used for the method and system for detecting defective pixels and screen imperfections according to the invention.
Figure 3:
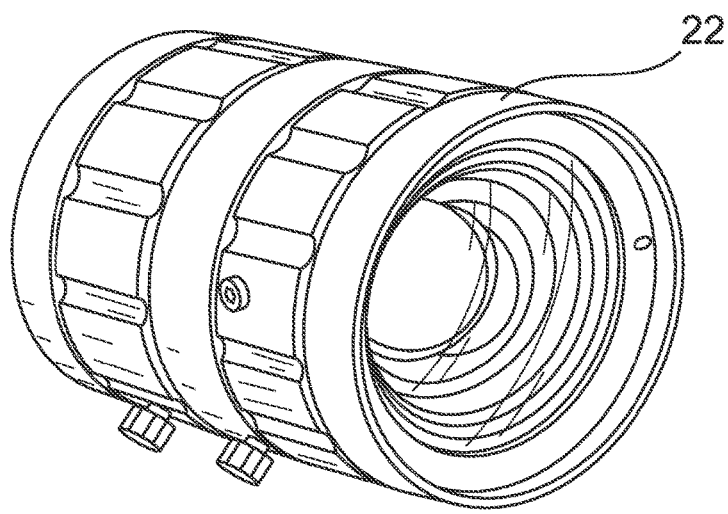
FIG. 3 is a pictorial representation of a testing camera lens used for the method and system for detecting defective pixels and screen imperfections according to the invention.

In the shown embodiment, the cameras 20a, 20b used for analysis are the Basler GigE #acA2500-14gc (see FIG. 2). As shown in FIGS. 1 and 3, each camera 20a, 20b uses a lens 22, such as 6 mm Compact Fixed Focal Length Lens, which are chosen with aperture f/1.4-f/16 in order to capture enough lighting for an image to be analyzed in a dark environment, as required for the method and system of the invention. A wide angle lens is utilized in order to cover maximum screen surface area of the mobile device 1 while utilizing a shorter focal length in the testing chamber 10. In an exemplary embodiment, the resolution of the cameras 20a, 20b is 5 MP, as the defective pixels need to appear significantly different in comparison to other pixels at this resolution. A 15 MP or higher resolution camera cannot be used because, as the resolution of the camera gets higher, the change of RGB values decreases as these changes are spread across more pixels. As the RGB values variance decreases, it becomes increasingly difficult to identify defects.

Table 1 below shows the comparison of the resolution of the camera versus the resolution of the mobile device 1 (5:1) in an exemplary embodiment of the invention. Table 1 shows that the first testing camera 20a captures about 5 million pixels in which the display 2 crop area is 2 million pixels and the pixels that fall into the camera 20a view is 0.33 million pixels. The second testing camera 20b captures another 5 million pixels in which the display 2 crop area is 1.67 million pixels and the pixels that fall into the camera view is 0.31 million pixels. This correlates to a total of approximately 3.5 million pixels of the captured image corresponds to 0.64 million pixels on the actual display 2 of the mobile device 1. This means 1 pixel on the display 2 of the mobile device 1 corresponds to approximately 5 pixels on the actual captured image taken by the cameras 20a, 20b.

TABLE 1

Exemplary Camera Pixel ratio comparison to Tablet

|  | HD Camera | Tablet |
|---|---|---|
| 1$^{st}$ Testing Camera 20a Resolution | 2590 × 942 (5 million Pixels) |  |
| 2$^{nd}$ Testing Camera 20b Resolution | 2590 × 1942 (5 million Pixels) |  |
| Display Area resolution for Top Section of Display 2 (Testing Camera 20a) | 1200 × 1720 (2 million Pixels) | 560 × 600 (.33 million Pixels) |
| Display Area resolution for Bottom Section of Display 2 (Testing Camera 20b) | 1200 × 1395 (1.67 million Pixels) | 520 × 600 (.31 million Pixels) |
| Total Pixel ratio | 3.5 million Pixels (5:1) | .64 million Px |

After the mobile device 1 is positioned in the testing chamber 10, the defective pixel mobile application commands the mobile device 1 to make the display 2 black with backlight turned ON to a maximum setting. The first testing camera 20a captures a first image of the top section of the display 2 and the second testing camera 20b captures a second image of the bottom section of the display 2. In general, the first image and the second image are then analyzed for any sudden drastic changes in the intensity of light across the black display 2. Any changes are recorded and are compared against a set of parameters that will determine if the RGB value falls under damaged pixel criterion or a good pixel criterion, as will be described in more detail below.

In general, each captured image is analyzed to find any defective pixels and then analyzed to determine if the defective pixel is large enough to be considered as a failure. If it falls into fail criteria, a circle is applied around the defective pixel to visually show the location of the defective pixel in the captured image. The same analysis is conducted for captured images of both the top and bottom sections of the display 2 using the first testing camera 20a and the second testing camera 20b. An overlap area is also considered.

Now with respect to FIGS. 4 through 9, a defective pixel detection analysis of the method and system for detecting defective pixels and screen imperfections will be described in more detail.

Figure 4:
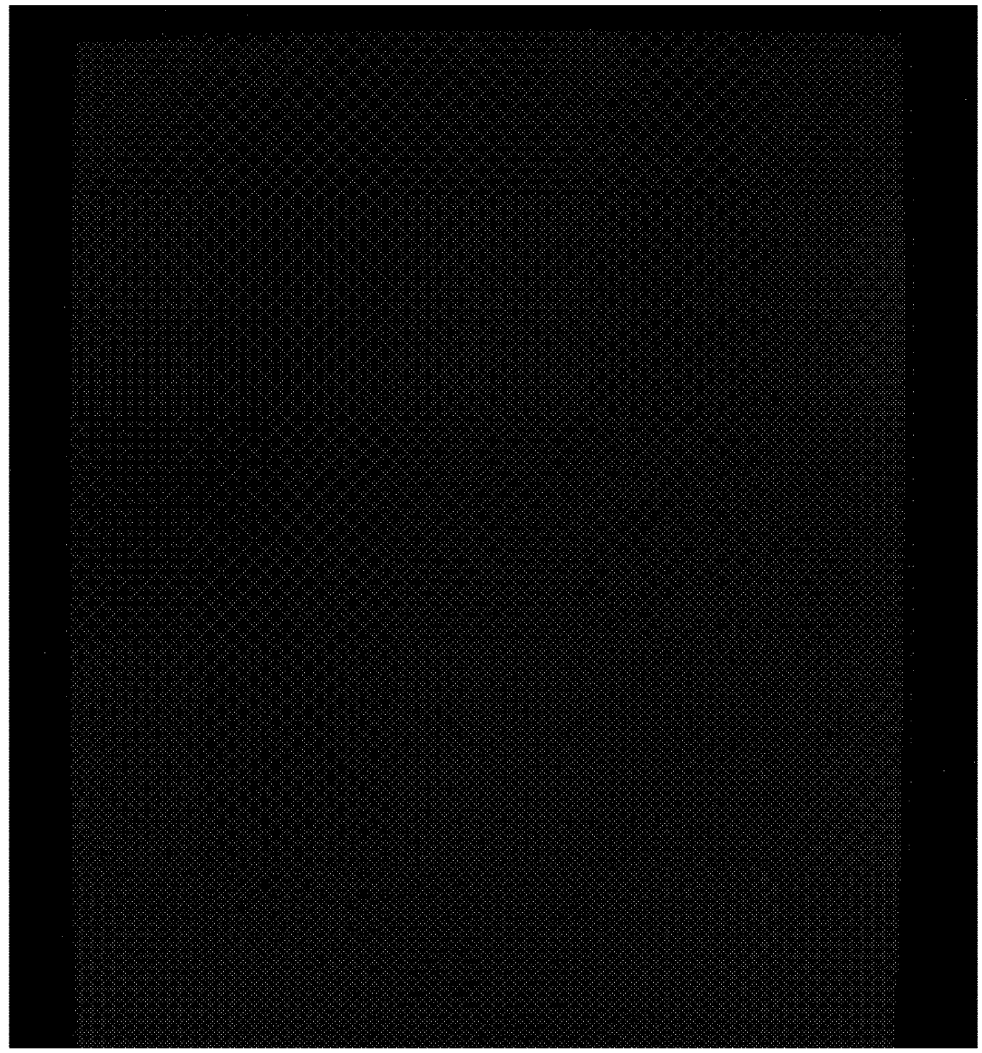
FIG. 4 is a pictorial representation of a first analyzed image of a top section of the mobile device captured by a first testing camera used for the method and system for detecting defective pixels and screen imperfections according to the invention and showing no defects.
Figure 5:
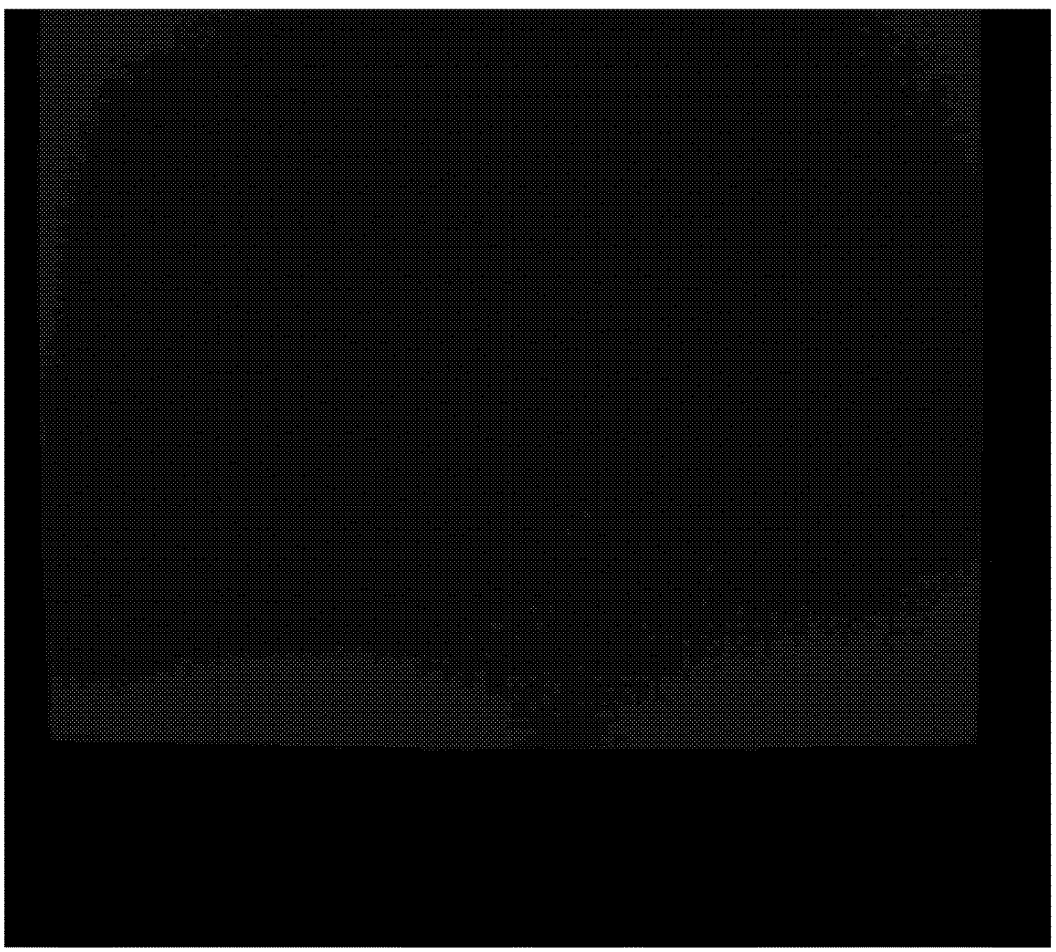
FIG. 5 is a pictorial representation of a second analyzed image of a bottom section of the mobile device captured by a second testing camera used for the method and system for detecting defective pixels and screen imperfections according to the invention and showing no defects.

Firstly, FIG. 4 and FIG. 5 illustrate examples of an analyzed image without any pixel defects. In particular, FIG. 4 shows an analyzed first image of the top section of the display 2 by the first testing camera 20a, while FIG. 5 shows an analyzed first image of the bottom section of the display 2 by the second testing camera 20b.

Figure 6:
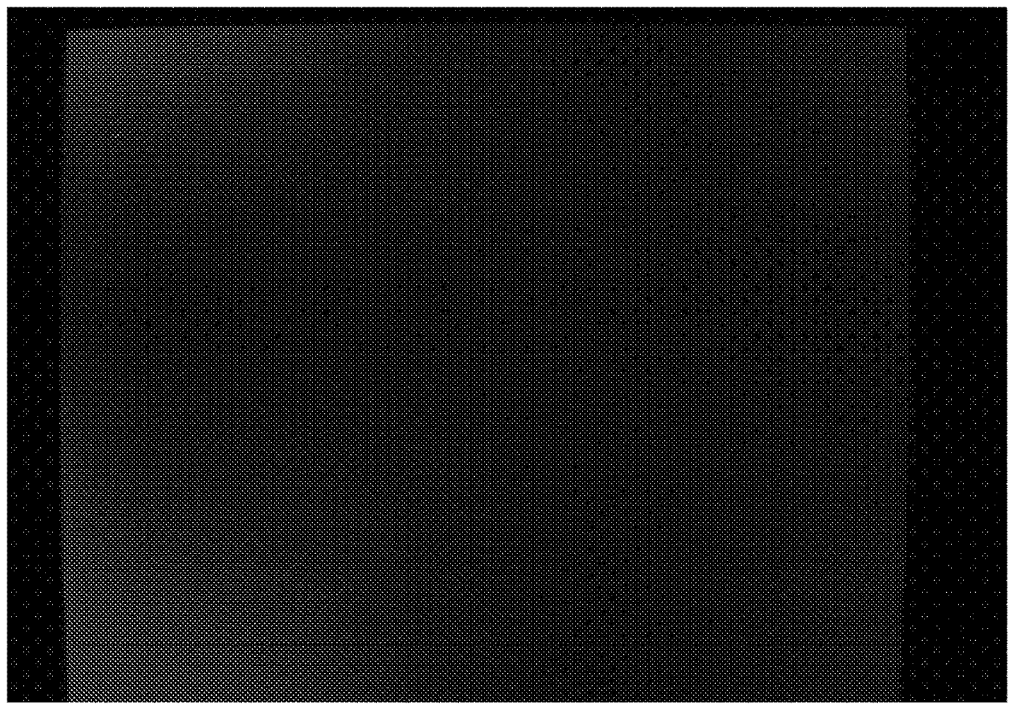
FIG. 6 is a pictorial representation of a cropped image of the first analyzed images used for the method and system for detecting defective pixels and screen imperfections according to the invention.

Firstly, the captured images of the top and bottom sections of the display 2 are analyzed and cropped to the display 2 size by a computer which then runs several steps to perform a defective pixel detection analysis. An example of a picture after cropping to the display 2 size is shown in FIG. 6.

Each captured image from the first testing camera 20a and the second testing camera 20b is a photographic representation of rows and columns of pixels of the display 2, for instance an LED display, and each pixel is made of Red, Green and Blue values (RGB values) in the shown embodiment. However, one skilled in the art should appreciate that the method could be easily applied to other color models, including CMYK.

Figure 7:
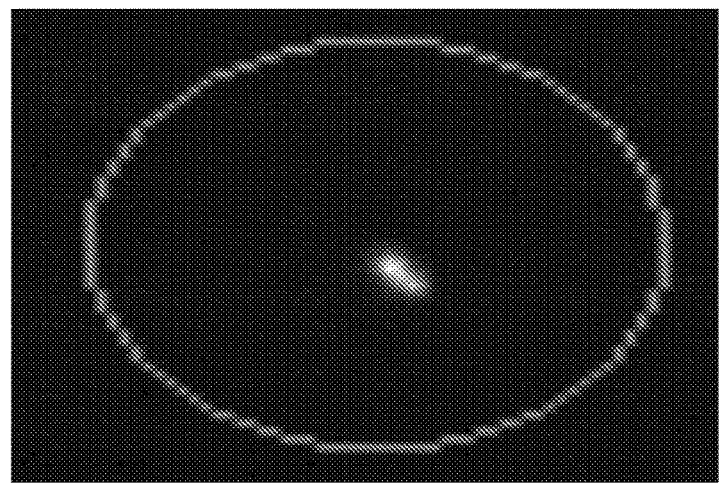
FIG. 7 is a pictorial representation of defective pixel captured in the first analyzed image and analyzed by the method and system for detecting defective pixels and screen imperfections according to the invention.

In the shown embodiment, and according to the invention, the RGB values vary from 0-255. For example, a pure white pixel color has values of R=255, G=255 and B=255, and a pure black pixel color has values of R=0, G=0 and B=0. As shown in FIG. 7, a defective pixel is identified and shown using the backlight of the mobile device 1. The surrounding pixels are black since the defective pixel mobile application requires that the display 2 display black.

FIG. 7 (circled in red) shows an example of several identified and illuminated defective pixels. Each set of 5 pixels in FIG. 7 is a single pixel on the mobile device 1. The RGB value of the questionable pixels will have values of R&B greater than 30 or R&G greater than 30 or B&G greater than 30; the questionable pixels that are illuminated are made up of mixed colors, in which at least two of the R, G and B have values greater than 30. The non-questionable pixel categories are eliminated at the initial stage of analysis. The questionable pixels undergo a more detailed criteria check step to determine if they exhibit a drastic change from the 8 surrounding pixels.

The criteria check step is performed by comparing the questionable pixels against 8 surrounding pixels. In the event more than 4 of the surrounding pixels show a significant variance from the questionable pixel, then the questionable pixel is categorized as a drastic change pixel. All the questionable pixels are analyzed in this method and grouped within a 15×15 pixel range. If there are more than 5 drastic change pixels in one group, then it shows that there is a defective pixel in the mobile device 1 which is then considered a failure.

A pixel is considered questionable if it shows a drastic change when compared to adjacent pixels. A drastic change is defined as a drastic change in RGB values for the questionable pixel when compared to 8 surrounding pixels. If any of the RGB value changes should be above 25, and if the other 2 values are greater than 3, then it is considered a questionable pixel.

In an exemplary embodiment, shown in FIGS. 19 and 20, the difference of R, G, and B values are calculated by comparing all the 8 surrounding pixels against a center pixel. After finding the differences, each set of RGB values is then checked to see if the difference of one of them changed by a value of at least 25, and if one of the 2 values should be greater than 3. This indicates that there is a drastic change. In the below example, FIG. 19, 6 out of 8 surrounding pixels fall into that criterion. Since it is higher than the set limit of 4, the center pixel is considered a questionable pixel. This analysis is conducted for all the pixels for which at least two of the R, G and B have values greater than 30.

Figure 21:
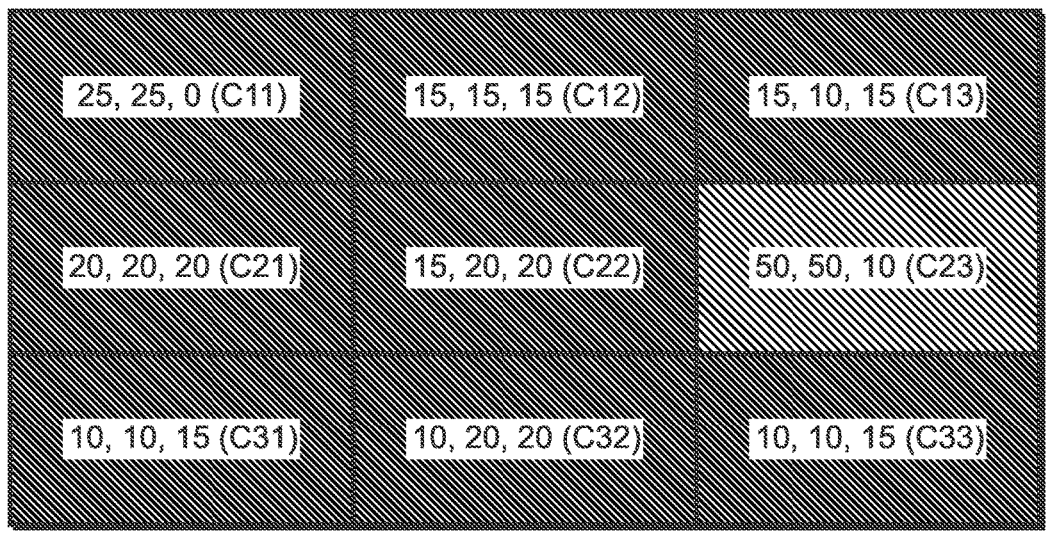
FIG. 21 is a graphical representation showing actual RGB values of a good pixel in the exemplary embodiment of the invention.
Figure 22:
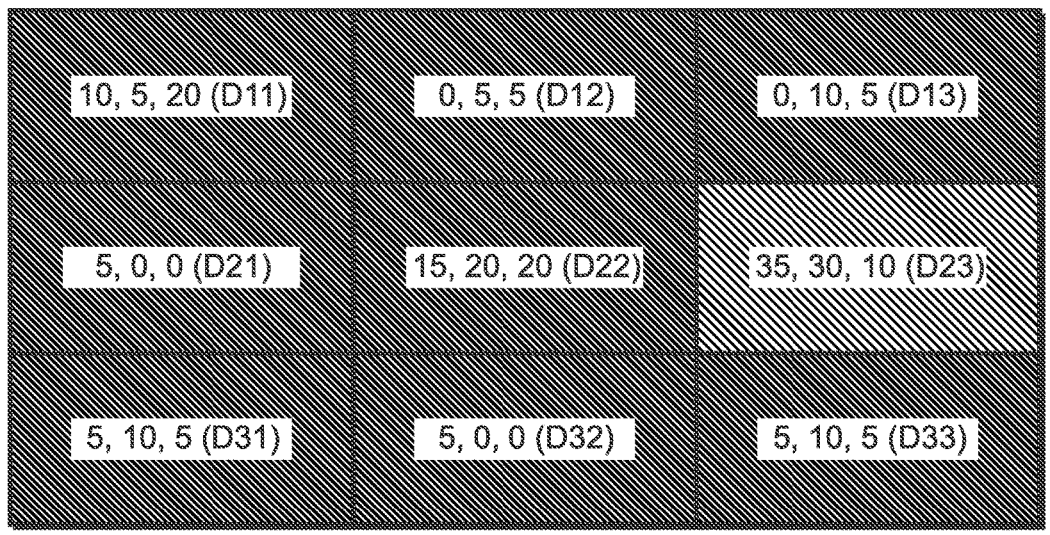
FIG. 22 is a graphical representation showing a difference of RGB values compared to center of a good pixel in the exemplary embodiment of the invention.

A pixel is considered good if it does not show a drastic change. A drastic change is defined as a significant variance in RGB values compared to 8 surrounding pixels. In order to be a good pixel, the variance in any RGB value must be below 25 as compared to the 8 surrounding pixels under analysis. In the event one value is greater than 25, then each of the remaining 2 values must have a variance below 3. FIGS. 21 and 22 show the analysis of a good pixel.

Next, questionable pixels are grouped within a 15×15 pixel range. This is grouped to find a defect in a damaged area. Up to four questionable pixels within a 15×15 pixel range in the captured picture is acceptable, since this equates to less than one defective pixel on the display 2. Five or more questionable pixels within a 15×15 pixel range in the camera picture will be categorized as a defective pixel. A few examples of a pixel damage group are shown in Table 2.

TABLE 2

Example of 3 Defective Pixel Groups - More than 4 questionable pixels in a 10 × 10 range

| Group #1: 8 Questionable Pixels | | | | |
|---|---|---|---|---|
| X: 385 | Y: 1036 | R: 45 | G: 21 | B: 34 |
| X: 384 | Y: 1037 | R: 74 | G: 52 | B: 38 |
| X: 385 | Y: 1037 | R: 44 | G: 33 | B: 67 |
| X: 386 | Y: 1037 | R: 33 | G: 22 | B: 56 |
| X: 384 | Y: 1038 | R: 65 | G: 64 | B: 44 |
| X: 385 | Y: 1038 | R: 23 | G: 50 | B: 67 |
| X: 384 | Y: 1039 | R: 64 | G: 40 | B: 36 |
| X: 385 | Y: 1039 | R: 24 | G: 41 | B: 49 |
| Group #2: 16 Questionable Pixels | | | | |
| X: 265 | Y: 359 | R: 56 | G: 35 | B: 42 |
| X: 266 | Y: 359 | R: 59 | G: 38 | B: 45 |
| X: 267 | Y: 359 | R: 26 | G: 46 | B: 53 |
| X: 265 | Y: 360 | R: 99 | G: 46 | B: 42 |
| X: 266 | Y: 360 | R: 109 | G: 56 | B: 52 |
| X: 267 | Y: 360 | R: 116 | G: 70 | B: 55 |
| X: 268 | Y: 360 | R: 98 | G: 52 | B: 37 |
| X: 265 | Y: 361 | R: 100 | G: 69 | B: 48 |
| X: 266 | Y: 361 | R: 113 | G: 82 | B: 61 |
| X: 267 | Y: 361 | R: 114 | G: 113 | B: 85 |
| X: 268 | Y: 361 | R: 94 | G: 93 | B: 65 |
| X: 265 | Y: 362 | R: 37 | G: 57 | B: 46 |
| X: 266 | Y: 362 | R: 71 | G: 91 | B: 80 |
| X: 267 | Y: 362 | R: 113 | G: 135 | B: 86 |

TABLE 2-continued

Example of 3 Defective Pixel Groups - More than
4 questionable pixels in a 10 × 10 range

| | | | | |
|---|---|---|---|---|
| X: 268 | Y: 362 | R: 102 | G: 124 | B: 75 |
| X: 269 | Y: 362 | R: 17 | G: 59 | B: 45 |
| Group #3: 7 Questionable Pixels | | | | |
| X: 372 | Y: 1488 | R: 41 | G: 53 | B: 51 |
| X: 373 | Y: 1488 | R: 55 | G: 56 | B: 40 |
| X: 374 | Y: 1488 | R: 40 | G: 41 | B: 25 |
| X: 373 | Y: 1489 | R: 55 | G: 107 | B: 58 |
| X: 374 | Y: 1489 | R: 40 | G: 92 | B: 43 |
| X: 373 | Y: 1490 | R: 28 | G: 75 | B: 57 |
| X: 374 | Y: 1490 | R: 25 | G: 72 | B: 54 |

Table 2 shows that group#1 has 8 questionable pixels which correspond to approximately 2 defective pixels in one area on the tablet. Group#2 has 16 questionable pixels that correspond to 3 defective pixels in another area. Group#3 has 7 questionable pixels which correspond to approximately 2 defective pixels in another area of the tablet.

Figure 8:
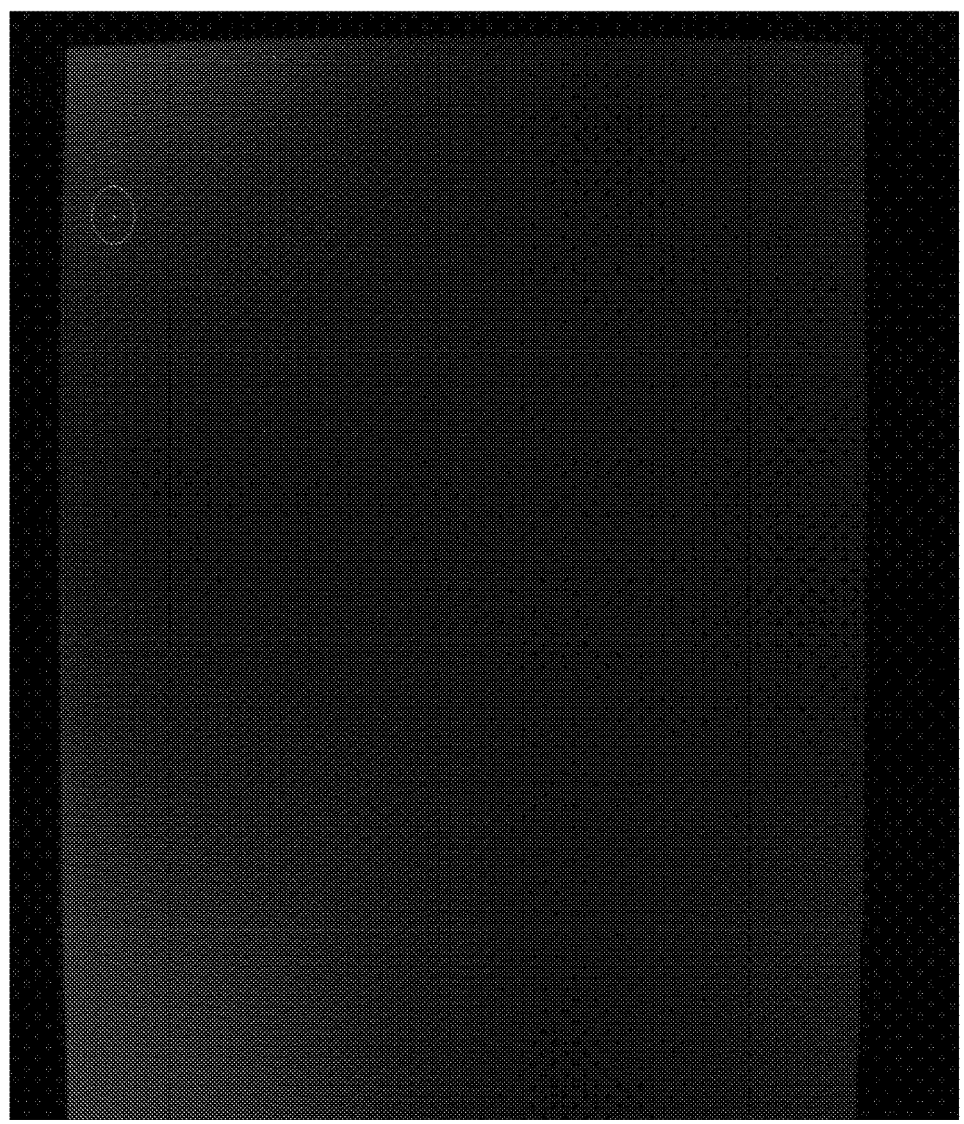
FIG. 8 is a pictorial representation of a first analyzed image from the first camera used to analyze the top section of the mobile device and showing one or more defects.
Figure 9:
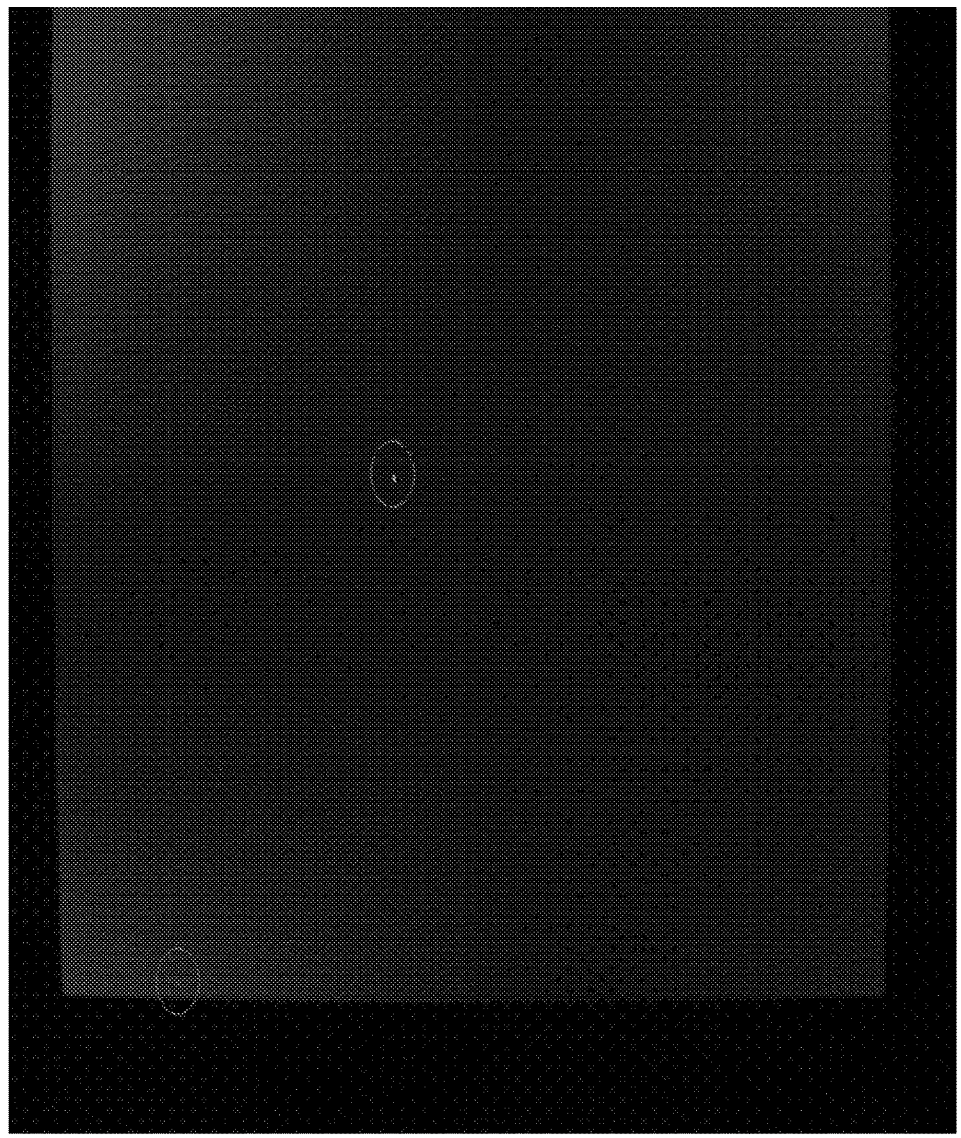
FIG. 9 is a pictorial representation of a second analyzed image from the second camera used to analyze the bottom section of the mobile device and showing one or more defects.

With respect to FIG. 8 and FIG. 9, analyzed captured images are shown and display one or more defective pixels. In FIG. 8, the analyzed captured image from the first testing camera 20a is shown, and was used to analyze the top section of the display 2. Likewise, as shown in FIG. 9, the analyzed captured image from the second testing camera 20b is shown, and was used to analyze the bottom section of the display 2.

Now with respect to FIGS. 10 through 18, a scratch detection analysis of the method and system for detecting defective pixels and screen imperfections will be described in more detail. The scratch detection technique can be performed in addition to or alternatively to the defective pixel analysis described above.

The mobile device 1 is loaded with a scratch detection mobile application to analyze scratches to the display 2 of the mobile device 1. The scratch detection mobile application can be loaded through known cables, connectors and communications protocols. The scratch detection mobile application includes an algorithm that uses a high quality images taken by one or more testing cameras 20 to identify defective pixels. In particular, in the exemplary embodiment, the scratch detection mobile application sets the whole display 2 white with backlight turned ON to a maximum setting. The scratch detection mobile application can be loaded with the pixel detection mobile application, as a single application, or separately. The scratch detection mobile application, in an exemplary embodiment, is a custom Android application, but may be an application that functions on other mobile device operating systems known to those with ordinary skill in the art.

If the scratch detection mobile application is loaded separately, the mobile device 1 is again manually positioned on a retention device 5 with the display 2 facing upward and way from the retention device 5. The retention device 5 is then positioned in the testing chamber 10. The testing chamber 10 is then closed and sealed from exterior light. The pair of cameras 20a, 20b are positioned from a top of the testing chamber 10 and face the display 2, as shown in FIG. 1.

Figure 10:
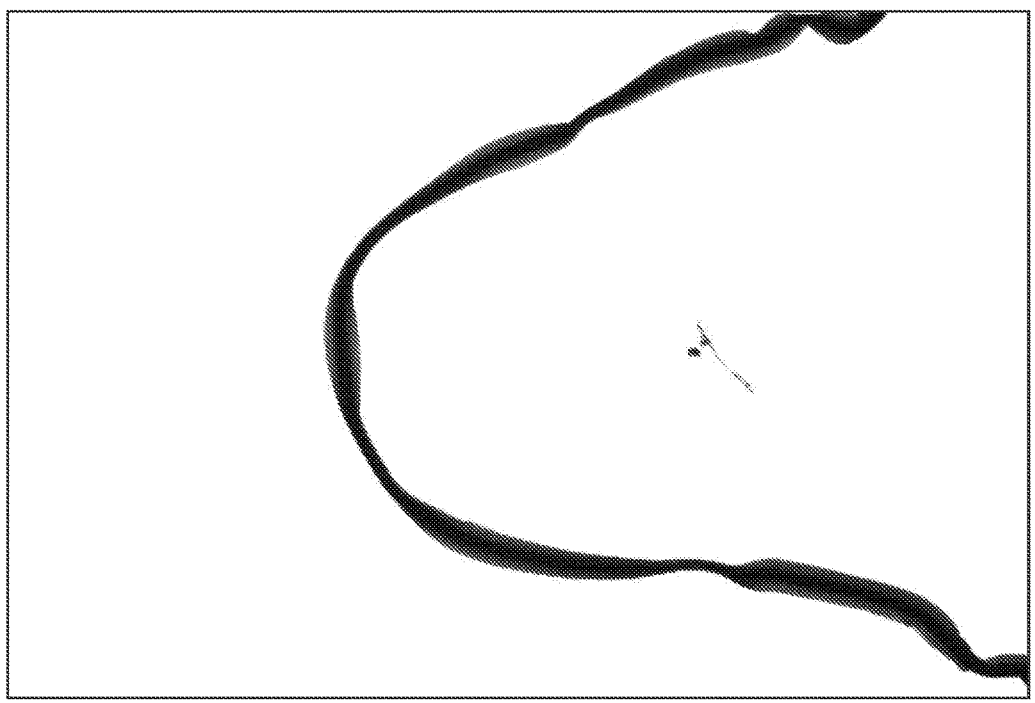
FIG. 10 is a pictorial representation of a scratch detection image for use by the method and system for detecting defective pixels and screen imperfections according to the invention.

As shown in FIG. 10, a captured image for analysis is taken with a white background loaded on the display 2 of the mobile device. White color enhances the visibility of the scratches and any defects on top of the screen are clearly visible for analysis. FIG. 10 illustrates an example of a defect on the screen of a mobile device 1.

In order to confirm the defective screen, a computer performs various image processing steps on captured images by the first testing camera 20a and the second testing camera 20b. These steps are described below.

Firstly, the pixels of the captured images are grouped. In an exemplary embodiment, each captured image is divided into small group of 8×8 pixel groupings (64 pixels). The standard deviation of RGB value for the whole group of 64 pixels is calculated and used in the next step.

Next, if the standard deviation of the RGB value for the whole group of 64 pixels is above a deviation threshold, it is determined that the group of 64 pixels includes a defective pixel and is represented by a single pixel with white color. If the standard deviation of the whole group of 64 pixels is below the deviation threshold, then the whole group of 64 pixels is considered a good pixel and is represented by a single pixel of black color. In an exemplary embodiment, the threshold is calculated by:

$$[\text{RGB value} - \text{RGB value for the whole group (i.e. 64 pixels)}] < \text{Standard Deviation } s = 8 \quad \text{Equation 1:}$$

The analysis is done for all the 8×8 pixel groupings (64 pixels) of the captured image, and then the captured image with these 8×8 pixel groupings (64 pixels) is represented by an grouped image (1/64th in size to the captured image) with each pixel of the grouped image representing a 8×8 pixel grouping (64 pixels) of the captured image.

Figure 11:
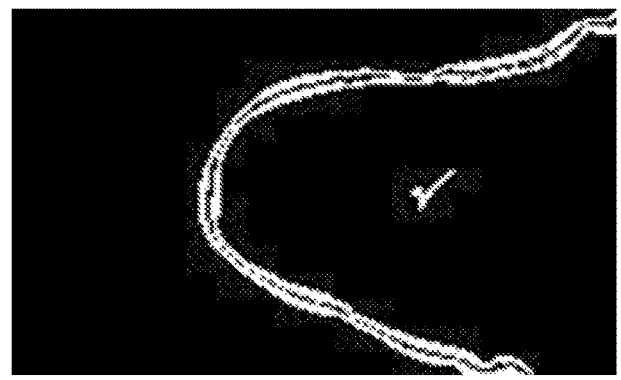
FIG. 11 is a pictorial representation of a converted gray scale image of the scratch detection image for the method and system for detecting defective pixels and screen imperfections according to the invention.

The grouped image is then converted to gray scale for further analysis. FIG. 11 shows an exemplary grayscale converted image of the grouped image prepared from the captured image in FIG. 10.

Figure 12:
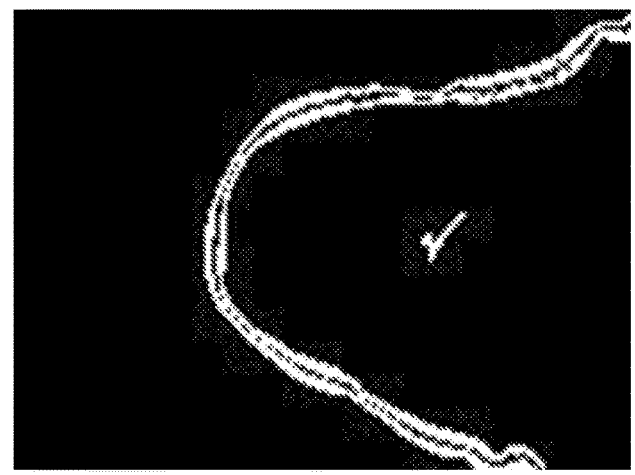
FIG. 12 is a pictorial representation of the converted gray scale image of FIG. 11 with grayscale spec map image processing.

Next, the grayscale converted image is applied with a grayscale spec map to make the grayscale converted image more clear for analysis. FIG. 12 shows an example of the grayscale converted image with a grayscale spec map applied.

Figure 13:
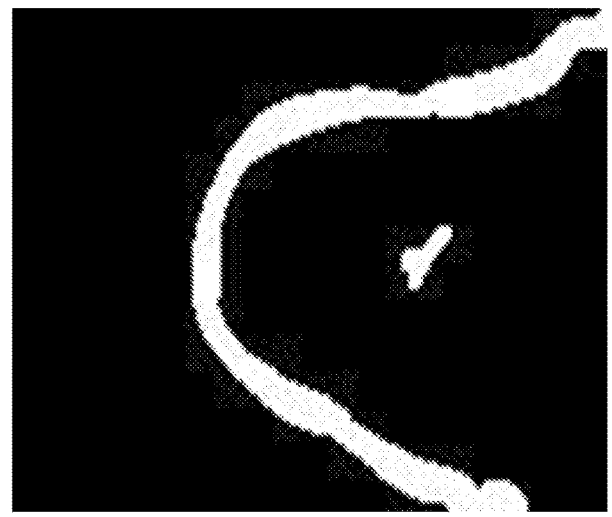
FIG. 13 is a pictorial representation of the converted gray scale image of FIG. 12 with dilation image processing.
Figure 14:
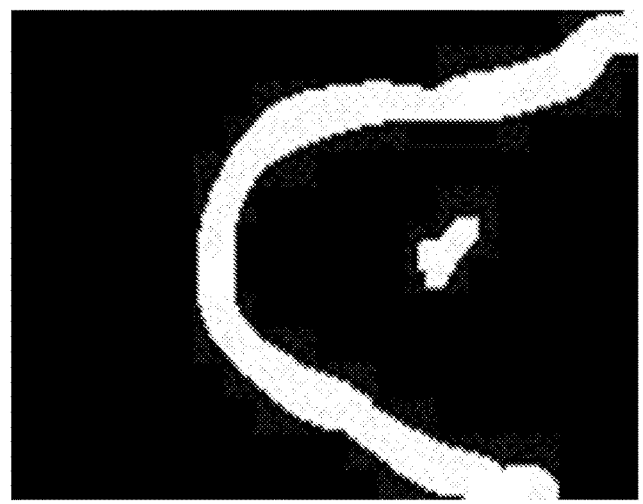
FIG. 14 is a pictorial representation of the converted gray scale image of FIG. 13 with further dilation image processing.
Figure 15:
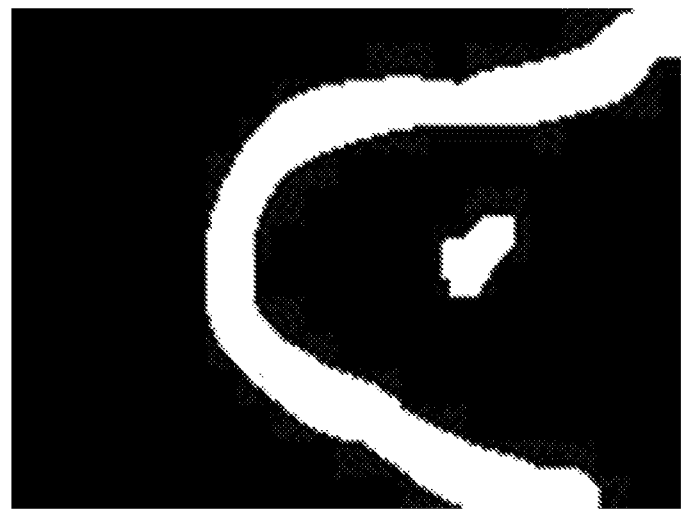
FIG. 15 is a pictorial representation of the converted gray scale image of FIG. 14 with further applied dilation image processing.

The grayscale converted image, with an applied grayscale spec map applied, is then dilated to join the nearby dots together as shown in FIG. 13. When the nearby dots are joined together, any scratches to the screen will be visible. The grayscale converted image is then dilated again to make the distant dots join together as shown in FIG. 14. The grayscale converted image is then dilated once again in the process of image analysis as shown in FIG. 15.

Figure 16:
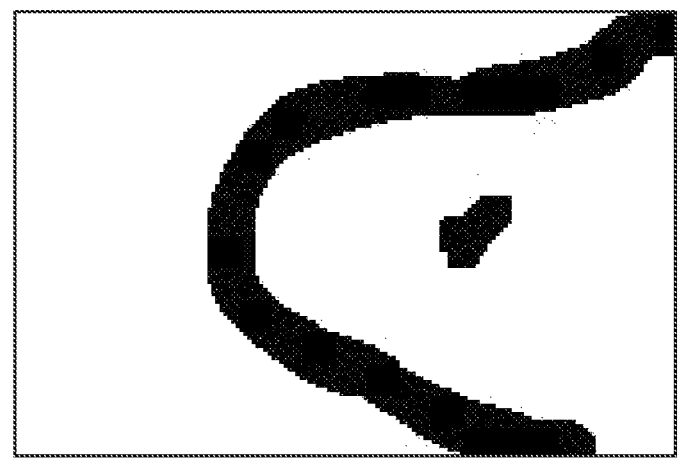
FIG. 16 is a pictorial representation of the converted gray scale image of FIG. 15 with inversion image processing.

Next, the grayscale converted image, which has been dilated three times and a grayscale spec map applied, is inverted. As a result, the white pixels are converted to black and the black pixels are converted to white so that a filter analysis can be performed. An inverted image of the grayscale converted image from FIG. 15 is shown in FIG. 16.

Figure 17:
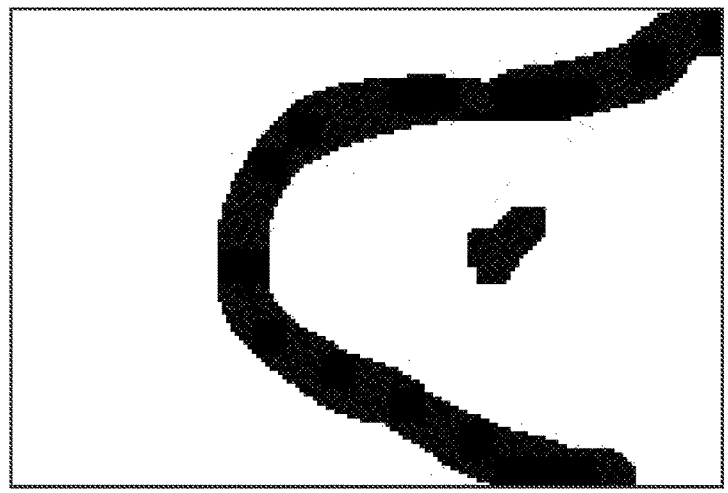
FIG. 17 is a pictorial representation of the converted gray scale image of FIG. 16 with filter image processing.

Next, the inverted image is then filtered to eliminate small artifacts that have zero consequence as part of the analysis. The filtered image of FIG. 16 is shown in FIG. 17. The filtering size can be adjusted to find scratches with various lengths or defects on the screen of the mobile device 1.

Figure 18:
FIG. 18 is a pictorial representation of the converted gray scale image of FIG. 17 with further inversion image processing.

As shown in FIG. 18, a final image is prepared from the filter image of FIG. 17. This is performed by inverting the filtered image. The final image is then analyzed for scratch detection of the screen of the mobile device 1.

Finally, the final image is analyzed by the computer and checked for RGB values to find if there are any white pixels in the final image. If a white pixel is found, the scratch detection analysis identifies a scratch on the screen of the mobile device 1. In the example shown in FIG. 18, two scratches are identified on the screen of the mobile device. As a result, the scratch detection analysis determined that the screen is defective.

The foregoing illustrates some of the possibilities for practicing the invention. Many other embodiments are possible within the scope and spirit of the invention. Therefore, more or less of the aforementioned components can be used to conform to that particular purpose. It is, therefore, intended that the foregoing description be regarded as illustrative rather than limiting, and that the scope of the invention is given by the appended claims together with their full range of equivalents.

What is claimed is:

1. A method for detecting defective pixels and screen imperfections, comprising the steps of:
   positioning a mobile device having a display screen in a testing chamber;
   capturing an image of the display screen using a camera directed to the display screen, wherein the image has a plurality of image pixels and is a photographic representation of rows and columns of a plurality of display pixels of the display screen, each image pixel having Red, Green, and Blue values (RGB values) varying from 0-255;
   performing a pixel detection analysis of the image;
   determining an image pixel of the plurality of image pixels is a questionable pixel if at least two of the R, G, and B values of the image pixel are greater than 30;
   comparing the questionable pixel against 8 surrounding pixels:
   categorizing the questionable pixel as a drastic change pixel when more than 4 of the 8 surrounding pixels have a significant variance from the questionable pixel, the categorizing step including calculating a difference for each of the R, G, and B values between the questionable pixel and each of the surrounding pixels, a surrounding pixel of the surrounding pixels having the significant variance from the questionable pixel if the difference of one of the R, G, and B values is at least 25 and the difference of at least one of the other two R, G, and B values is greater than 3.

2. The method according to claim 1, further comprising the step:
   loading a defective pixel mobile application to the mobile device.

3. The method according to claim 2, wherein the defective pixel mobile application is loaded through a connector or communication protocol.

4. The method according to claim 2, wherein the defective pixel mobile application sets the display screen black with a backlight turned ON to a maximum setting.

5. The method according to claim 2, wherein the defective pixel mobile application is an application that functions on a mobile device operating system.

6. The method according to claim 1, wherein a pure white pixel color has values of R=255, G=255 and B=255 and a pure black pixel color has values of R=0, G=0 and B=0.

7. The method according to claim 1, further comprising the step of: identifying a defective display pixel when there are more than 5 drastic change pixels in a 15×15 image pixel range.

* * * * *